US011436906B1

(12) United States Patent
Peddinti

(10) Patent No.: US 11,436,906 B1
(45) Date of Patent: Sep. 6, 2022

(54) VISITOR DETECTION, FACIAL RECOGNITION, AND ALERT SYSTEM AND PROCESSES FOR ASSISTING MEMORY-CHALLENGED PATIENTS TO RECOGNIZE ENTRYWAY VISITORS

(71) Applicant: Sidhya V Peddinti, Richardson, TX (US)

(72) Inventor: Sidhya V Peddinti, Richardson, TX (US)

(*) Notice: Subject to any disclaimer, the term of this patent is extended or adjusted under 35 U.S.C. 154(b) by 122 days.

(21) Appl. No.: 16/876,729

(22) Filed: May 18, 2020

(51) Int. Cl.
| | |
|---|---|
| G08B 21/02 | (2006.01) |
| G08B 5/36 | (2006.01) |
| G08B 13/196 | (2006.01) |
| G06V 40/16 | (2022.01) |

(52) U.S. Cl.
CPC .......... *G08B 21/02* (2013.01); *G06V 40/166* (2022.01); *G06V 40/172* (2022.01); *G08B 5/36* (2013.01); *G08B 13/19695* (2013.01)

(58) Field of Classification Search
CPC .... G08B 21/02; G08B 5/36; G08B 13/19695; G06K 9/00255; G06K 9/00288
See application file for complete search history.

(56) References Cited

U.S. PATENT DOCUMENTS

| | | | | | |
|---|---|---|---|---|---|
| 4,764,953 A | * | 8/1988 | Chern | ................... | H04M 11/025 379/388.01 |
| 5,428,388 A | * | 6/1995 | von Bauer | ............. | H04N 7/186 455/67.11 |
| 7,187,279 B2 | * | 3/2007 | Chung | ................. | G08B 25/002 340/541 |
| 7,263,182 B2 | * | 8/2007 | Allen | ................... | H04M 11/025 379/159 |
| 7,450,015 B2 | * | 11/2008 | Singer | ................ | G08B 13/2454 340/556 |
| 7,504,942 B2 | * | 3/2009 | Marman | ................ | G06V 10/95 340/541 |
| 7,583,191 B2 | * | 9/2009 | Zinser | ...................... | H04N 7/20 340/541 |
| 7,683,940 B2 | * | 3/2010 | Fleming | ............... | G11B 27/034 348/222.1 |
| 7,733,224 B2 | * | 6/2010 | Tran | ..................... | A61B 5/0006 340/8.1 |
| 7,847,820 B2 | * | 12/2010 | Vallone | ................ | G06V 40/172 348/150 |
| 7,945,032 B2 | * | 5/2011 | Elberbaum | ........ | G07C 9/00571 379/102.06 |
| 8,054,340 B2 | * | 11/2011 | Miki | ...................... | H04N 5/772 348/231.2 |
| 8,120,459 B2 | * | 2/2012 | Kwak | ..................... | H04L 12/64 340/5.2 |

(Continued)

*Primary Examiner* — Philip P. Dang
(74) *Attorney, Agent, or Firm* — Plager Schack LLP; Mark H. Plager; Stephen Hallberg

(57) ABSTRACT

A visitor detection, facial recognition, and alert system and processes for assisting memory-challenged patients to recognize entryway visitors are disclosed. The visitor detection, facial recognition, and alert system and processes assist a memory-challenged patient to distinguish between known and unknown visitors and inform a caretaker of such known and unknown visitors. The visitor detection, facial recognition, and alert system provides an assistive tool for Alzheimer's patients to recognize their visitors using facial recognition technology.

8 Claims, 7 Drawing Sheets

(56) References Cited

U.S. PATENT DOCUMENTS

| | | | | |
|---|---|---|---|---|
| 8,139,098 B2* | 3/2012 | Carter | .................... | H04M 11/00 |
| | | | | 348/14.06 |
| 8,204,273 B2* | 6/2012 | Chambers | ............... | G06V 20/52 |
| | | | | 382/282 |
| 8,323,189 B2* | 12/2012 | Tran | ..................... | A61B 5/4875 |
| | | | | 600/300 |
| 8,350,694 B1* | 1/2013 | Trundle | ................. | G08B 25/14 |
| | | | | 340/539.11 |
| 8,358,342 B2* | 1/2013 | Park | ..................... | G06F 16/784 |
| | | | | 348/136 |
| 9,711,036 B2* | 7/2017 | Fadell | .................. | G06Q 10/063 |
| 9,734,644 B2* | 8/2017 | Samad | ................... | H04N 7/186 |
| 9,997,036 B2* | 6/2018 | Scalisi | ............... | H04N 5/23219 |
| 10,133,935 B2* | 11/2018 | Child | ..................... | H04N 7/186 |
| 10,252,145 B2* | 4/2019 | Tran | ........................... | G06F 3/00 |
| 10,305,895 B2* | 5/2019 | Barry | .................. | G06V 40/172 |
| 10,524,722 B2* | 1/2020 | Kusens | .................... | A61B 5/11 |
| 10,586,114 B2* | 3/2020 | Potter | ............. | G08B 13/19602 |
| 10,635,907 B2* | 4/2020 | Child | ..................... | G06V 20/52 |
| 10,664,688 B2* | 5/2020 | Goulden | .............. | H04M 11/025 |
| 11,134,227 B2* | 9/2021 | Goulden | ............... | H04M 11/02 |
| 11,139,081 B2* | 10/2021 | Tran | ........................ | G16H 50/70 |
| 2002/0113862 A1* | 8/2002 | Center, Jr. | ........... | H04N 19/186 |
| | | | | 348/E7.083 |
| 2004/0080615 A1* | 4/2004 | Klein | ............... | G08B 13/19658 |
| | | | | 348/143 |
| 2004/0085205 A1* | 5/2004 | Yeh | ........................ | H04N 7/186 |
| | | | | 340/540 |
| 2007/0115390 A1* | 5/2007 | Makara | .................. | H04N 7/186 |
| | | | | 348/553 |
| 2007/0153091 A1* | 7/2007 | Watlington | ........ | H04N 21/4223 |
| | | | | 348/208.14 |
| 2007/0182818 A1* | 8/2007 | Buehler | ........... | G08B 13/19671 |
| | | | | 348/143 |
| 2009/0010493 A1* | 1/2009 | Gornick | ............. | G08B 13/1963 |
| | | | | 382/103 |
| 2009/0251545 A1* | 10/2009 | Shekarri | ................ | G06Q 10/00 |
| | | | | 348/158 |
| 2011/0029370 A1* | 2/2011 | Roeding | ................ | G01S 5/0257 |
| | | | | 705/14.38 |
| 2011/0143811 A1* | 6/2011 | Rodriguez | .............. | H04W 4/02 |
| | | | | 455/556.1 |
| 2011/0248818 A1* | 10/2011 | Hashim-Waris | ...... | H04W 12/08 |
| | | | | 340/5.52 |
| 2012/0019674 A1* | 1/2012 | Ohnishi | ................. | G08C 17/00 |
| | | | | 348/207.1 |
| 2012/0314901 A1* | 12/2012 | Hanson | .................. | G16H 40/67 |
| | | | | 600/595 |
| 2013/0046477 A1* | 2/2013 | Hyde | .................... | A61B 5/4833 |
| | | | | 702/19 |
| 2018/0087793 A1* | 3/2018 | Okita | .................... | H05B 47/105 |
| 2018/0342329 A1* | 11/2018 | Rufo | ...................... | G08B 25/10 |

\* cited by examiner

VISITOR DETECTION, FACIAL RECOGNITION, AND ALERT SYSTEM AND PROCESSES FOR ASSISTING MEMORY-CHALLENGED PATIENTS TO RECOGNIZE ENTRYWAY VISITORS

BACKGROUND

Embodiments of the invention described in this specification relate generally to assistive systems, and more particularly, to a visitor detection, facial recognition, and alert system and processes for assisting memory-challenged patients to recognize entryway visitors.

Patients with Alzheimer's disease typically have significant memory loss. However, such Alzheimer's patients and others with severe memory loss sometimes live alone. Those who live alone have no way of knowing that whether a visitor at their door is a loved one that is paying them a visit, or a solicitor or criminal that would cause significant anxiety or even physical harm to the patient.

Also, very many of those people with memory loss, such as Alzheimer's patients, or others who suffer from memory-loss of any origin often have trouble remembering daily tasks. As a result, they often miss many important daily routines that may further put their health and well-being at stake. These existing problems are faced daily by many Alzheimer's patients and other patients with significant memory loss, especially those who live independently (e.g., those who live alone and have no regular caretaker or routine care-taking service to check in on them) or semi-independently (e.g., those who live alone with one or more caretakers who routinely check in on their well-being, but who are not living in the same dwelling).

While there are some existing conventional Alzheimer's assistive devices for patient scheduling, none of them are not easy to update by the patient or their caregiver(s). Battery watch to locate the patient is not reliable if the battery is out of charge or patient loses them while they lose the track of their location.

Therefore, what is needed is a way to assist memory-challenged individuals who live alone and need assistance in staying safe when a visitor comes to their house or dwelling, and help them to distinguish between known visitors (who are safe) and unknown visitors (whose safety with respect to the patient or individual is not clear), as well as assist such memory-challenged individuals with reminders on specific tasks or items to address which may often be forgotten without a reminder.

BRIEF DESCRIPTION

A novel visitor detection, facial recognition, and alert system and novel processes for assisting memory-challenged patients to recognize entryway visitors are disclosed. In some embodiments, the visitor detection, facial recognition, and alert system assists a memory-challenged patient to distinguish between known and unknown visitors and informs a caretaker of such known and unknown visitors. In some embodiments, the visitor detection, recognition, and alert system includes a motion sensor, a camera, a patient display screen, and an entryway visitor alert computing device that includes an entryway visitor detection, facial recognition, and alert software application comprising a known person facial recognition image training module, an entryway visitor recognition and alert module, and a patient calendar reminder module.

In some embodiments, the processes for assisting memory-challenged patients to recognize entryway visitors include a known person facial recognition image training process, a visitor detection, facial recognition, and alert process for assisting a memory-challenged patient to distinguish between known and unknown visitors and informs a caretaker of such known and unknown visitors, and a patient calendar reminder process. The processes and system act as an assistive tool for a memory-challenged patient, such as a person with Alzheimer's disease, to recognize their visitors using facial recognition technology and which provides other features for attaining safer living.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
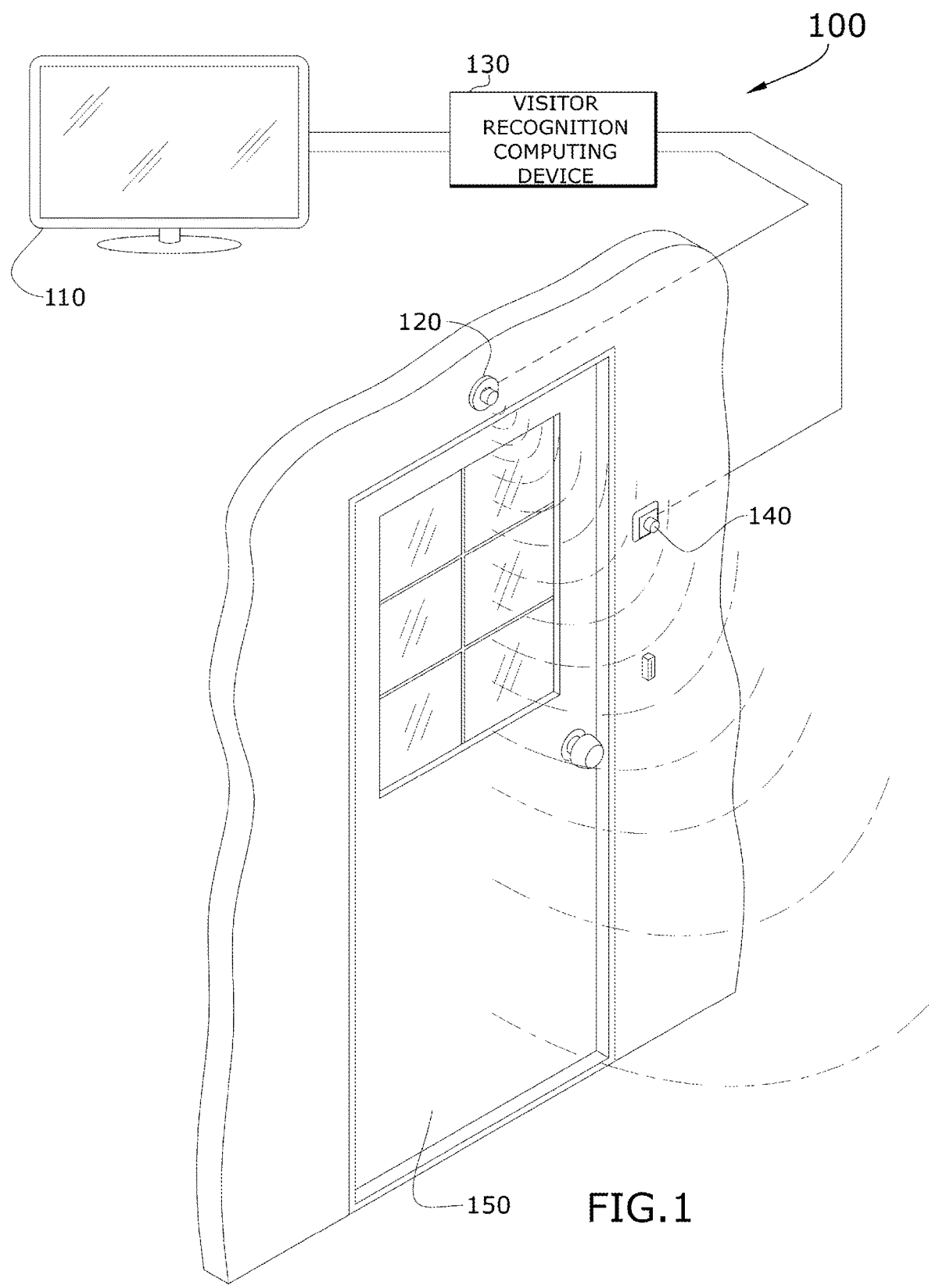
FIG. 1 conceptually illustrates a perspective view of a visitor detection, facial recognition, and alert system in some embodiments which assists a memory-challenged patient to distinguish between known and unknown visitors and informs a caretaker of such known and unknown visitors.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel visitor detection, facial recognition, and alert system and processes for assisting memory-challenged patients to recognize entryway visitors. In some embodiments, the visitor detection, facial recognition, and alert system assists a memory-challenged patient to distinguish between known and unknown visitors and informs a caretaker of such known and unknown visitors. In some embodiments, the visitor detection, recognition, and alert system includes a motion sensor, a camera, a patient display screen, and an entryway visitor alert computing device that includes an entryway visitor detection, facial recognition, and alert software application comprising a known person facial recognition image training module (that implements the known person facial recognition image training process), an entryway visitor recognition and alert module (that implements the visitor detection, facial recognition, and alert process), and a patient calendar reminder module (that implements the patient calendar reminder process). In some embodiments, the visitor detection, facial recognition, and alert system is something that can be powered at a patient's own home or dwelling with an electric supply. In some embodiments, the visitor detection, facial recognition, and alert system utilizes the best facial recognition technology to identify the visitors. In some embodiments, the visitor detection, facial recognition, and alert system sends alerts to caretakers so they have the tracking record of who is coming/going out of the patient's home or dwelling, including if or when the patient leaves home so that the caretaker can take precautions to help the patient avoid danger. In some embodiments, the visitor detection, facial recognition, and alert system provides patient alerts by visual output onto an in-home patient display screen and by audio-alerts in the form of a voice prompt with a detailed explanation of a task or the presence of a known or unknown visitor, in order to capture the patient's attention even when the patient is not in position to see the in-home patient display screen. In this way, the system is able to keep the patient safer by announcing or visually displaying visitors at a doorway entry to the patient's home or dwelling, identify and visual display an indication of whether the visitor is known to the patient or unknown to the patient, and grab the attention of the patient and remind them exact steps of what to be done for a task at the hour.

In some embodiments, the processes for assisting memory-challenged patients to recognize entryway visitors include a known person facial recognition image training process, a visitor detection, facial recognition, and alert process for assisting a memory-challenged patient to distinguish between known and unknown visitors and informs a caretaker of such known and unknown visitors, and a patient calendar reminder process. The processes and system act as an assistive tool for a memory-challenged patient, such as a person with Alzheimer's disease, to recognize their visitors using facial recognition technology and which provides other features for attaining safer living.

As stated above, many people with memory loss, such as Alzheimer's patients or others who have suffered significant memory loss or are otherwise memory-challenged, need help to recognize visitors at the outside of their home. Specifically, many memory-challenged individuals live alone and need assistance in staying safe when a visitor comes knocking, since it may often be difficult to distinguish between known visitors (who are safe) and unknown visitors (whose safety with respect to the patient or individual is not clear). Embodiments of the invention described in this specification solve such problems by a computing device/camera/sensor set-up that helps memory-challenged individuals to recognize visitors at their door using facial recognition technology, and which also notifies their caregiver(s) by image-based text messages when a visitor is at the memory-challenged individual's door or when the patient tries to wander away from the house, as well as providing alerts to the memory-challenged individual which include reminders to do certain tasks at certain designated times through a patient's scheduling calendar, which may be a cloud-based calendar (such as Google Calendar, accessed and integrated via Google Calendar API).

Embodiments of the visitor detection, facial recognition, and alert system and processes for assisting memory-challenged patients to recognize entryway visitors described in this specification differ from and improve upon currently existing options. In particular, the existing conventional assistive devices for Alzheimer's patients only focus on wearable battery-operated watches to track their location and some desktop devices that alert them for their daily chores. However, this leaves them vulnerable to unsafe visitors because there are no existing options, devices, or systems available anywhere in the market to help such memory-challenged patients to recognize visitors. By contrast, the visitor detection, facial recognition, and alert system and processes for assisting memory-challenged patients to recognize entryway visitors of the present disclosure helps memory-challenged individuals to distinguish between known and unknown visitors, in both visual ways and audio-based ways. In addition, the visitor detection, facial recognition, and alert system and processes for assisting memory-challenged patients to recognize entryway visitors of the present specification provides audible voice alerts for daily chores that can be easily added/modified by their loved ones or caretakers very easily from a calendar system, such as a cloud-based calendar system (e.g., Google Calendar).

In addition, some embodiments of the visitor detection, facial recognition, and alert system and processes for assisting memory-challenged patients to recognize entryway visitors improve upon the currently existing options by offering a home-based deployment option which is powered at home with electric supply so it is more reliable than a battery-reliant system (such as battery-powered watches) and which uses top facial recognition technology to identify the visitors. In some embodiments, the visitor detection, facial recognition, and alert system and processes for assisting memory-challenged patients to recognize entryway visitors also sends alerts to mobile devices of designated caretakers or loved ones so they have the tracking record of who is coming/going out of the patient's residence, including if/when the patient leaves home so they can take precautions to avoid danger to the patient.

The various elements of the visitor detection, facial recognition, and alert system and processes for assisting memory-challenged patients to recognize entryway visitors of the present disclosure may be related in the following exemplary fashion. A caretaker or a family member of the patient uploads all the known contacts with names and relation, etc., into a contact application (e.g., into Google Contacts application or other software to manage contacts). The caretaker or family member uploads the patient's daily chores and descriptions/steps into a cloud-based calendar system (e.g., Google Calendar). The visitor recognition computing device is outfitted with a camera and a motion sensor (e.g., a Raspberry Pi micro-computer that includes external devices such as a Pi Camera and a motion sensor), which are connected to the appropriate peripheral interface of the visitor recognition computing device (e.g., Raspberry Pi micro-computer) printed circuit board (PCB). The visitor recognition computing device is powered and connected to an internet provider either by wired (e.g., Ethernet) connection and/or by wireless (e.g., WiFi) connection. A display screen, which is either a TV screen or a computer monitor, is connected to the visitor recognition computing device (e.g., Raspberry Pi micro-computer) PCB board. Similarly a TV speaker or an autonomous audio speaker is connected to the PCB board of the visitor recognition computing device. In some embodiments, the motion sensor is connected to the PCB board of the visitor recognition computing device. In some embodiments, the motion sensor comprises an Arduino/Pi motion sensor.

For deployments in which the visitor recognition computing device is positioned away from the motion sensor and/or the camera, a near field wireless connection may be utilized, such as a Bluetooth connection.

In some embodiments, connections from the visitor recognition computing device to one or both of the motion sensor and the camera are made by wired connection. In some embodiments, when the visitor recognition computing device is positioned away from the motion sensor and/or the camera, long connector wires are used to attach the motion sensor and the camera to the PCB board of the visitor recognition computing device. In this way, the camera and the motion sensor can be installed outside the patient's door to capture video of a visitor's face upon detection of the visitor by the motion sensor. Thus, the visitor recognition computing device (e.g., Raspberry Pi), the patient display screen, and the audio speaker are positioned inside the patient's home at a location at which patient spends a significant amount of time. The underlying software-implementations of the processes for assisting memory-challenged patients to recognize entryway visitors may be coded (written) in programming languages like python and supporting libraries should be installed on the visitor recognition computing device (such as facial recognition modules and libraries that allow facial recognition API calls from any and all modules/software which implements any/all such process for assisting memory-challenged patients to recognize entryway visitors. When a visitor comes to the door of a patient's house or dwelling, the motion sensor would detect the visitor's motion and the camera would then be activated to take pictures of the visitor(s). The captured images of the visitor(s) are then transmitted from the camera to the visitor recognition computing device and ingested by the software or related software modules that implement the processes for assisting memory-challenged patients to recognize entryway visitors. The underlying code includes instructions (organized in one way or another as algorithmic processing steps) to receive each captured visitor image and find out if the visitor is a known contact or an unknown contact by analysis performed based on a face recognition learning module that has analyzed multiple pictures of faces of people known by the patient or known to be safe to the patient. In some embodiments, when a match is found for the captured visitor image, the underlying code running on the visitor recognition computing device retrieves additional information associated to the recognized visitor including, without limitation, the name of the recognized visitor, a relationship status of the visitor with respect to the memory-challenged individual (e.g., brother, sister, caretaker, friendly neighbor, close friend, doctor, etc.) are visually output onto the patient display screen and an audible alert is triggered, such as a voice alert that specifies similar relationship details to the patient, as well as other details as pre-configured in the system. In addition, the captured visitor image and the relationship data details are also sent to a pre-configured mobile phone number of a contact or the numbers of a list of contacts who are close to and/or who routinely assist the patient, such as the care giver, a spouse, a close blood relation, a close friend, etc. In this way, the pre-configured recipient(s) can get an image of the visitor via text, as well as vital relational details of the visitor via text message. Furthermore, if the memory-challenged patient steps out of the house, then the system sends a text message alert to each listed care giver or relation. In addition to these visitor-related safety features, the visitor detection, facial recognition, and alert system and processes for assisting memory-challenged patients to recognize entryway visitors also supports tasks saved in a cloud-based calendar system, such as Google Calendar (accessed via Google Calendar API). Task are then able to be ingested and processed so that task reminders are visually output onto the patient display screen and/or provided as an audible voice alert or "spoken" reminder of the task, with instructions or information needed to complete the task or carry out the requisite needs of the task or calendar entry.

In some embodiments, the visitor detection, facial recognition, and alert system and processes for assisting memory-challenged patients to recognize entryway visitors of the present disclosure generally works by the visitor recognition computing device and associated software reading in (or ingesting or importing) all of patient's contact information from a digital contact data repository, such as Google Contacts. The information is augmented by uploading (or conversely, ingesting or importing) contact images and pictures from a digital image repository, such as Google Photos. Both the contact information and the known contact photo-based images are uploaded by the caregiver to allow the visitor recognition computing device to be trained according to the set of pictures (ideally with different poses) and associated contact details (e.g., name, relation, age etc.) of all the known contacts of the patient. Thus, when a visitor is at the patient's door, the motion sensor can detect the visitor's movement and the camera module can snap a picture to capture an image of the visitor, and then hand off to the visitor recognition computing device for processing and alerting the patient inside the house/dwelling by visual display of the captured visitor image and an indicator, such as a specifically color-coded frame around the perimeter of the displayed visitor image (e.g., a red colored frame indicating an "unknown" visitor and a green colored frame indicated a "known" visitor), as well as provide an audible alert of the visitor outside the patient's door, with voice-based audio details describing relational details and indicate whether the visitor is known or unknown. In this way, the memory-challenged patient is reminded of the identity of known visitors and informed of their relationship details with respect to the patient.

In some embodiments, the pre-configured contact, who may be a caretaker, a caregiver, a spouse, a friend, a relation, etc., of the patient is also informed with the same information via transmission of the captured visitor image and relation details to the pre-configured contact's mobile device for display on the mobile device (e.g., via an MMS/SMS text message). This message will help the pre-configured contact (e.g., caregiver, friend, spouse, relation, etc.) to be informed and recognize the visitor and also monitor the patient's visitors. This helps ensure the patient stays safe from potential harm or malicious intrigue and/or fraud. Thus, in some embodiments, when an unknown dangerous person is at the door of the patient, then the code logic will fail to match the training data of known persons and it will send an alert to the pre-configured contact (e.g., caregiver, etc.) and also alert the patient that the visitor is unknown and not to open the door. Furthermore, once this information is received, the pre-configured contact can intervene and call the patient to verbally instruct the patient what to do or what not to do and may also reassure the patient if necessary. Similarly, if the patient wanders away from home, the camera captures a picture of the patient going out of the doorway and this is recognized by the code logic underlying the software running on the visitor recognition computing device (e.g., Raspberry Pi) as the patient, which immediately triggers a set of instruction to send an alert to the pre-configured contact (e.g., caregiver) so they can contact the patient or someone that is in the proximity of the patient to make sure patient is safe and brought back home.

In some embodiments, the calendar tracks events which are set up and stored in a calendar system (such as Google Calendar). The stored calendar events may have been input by the caregiver and may include instructions, steps, details, or other necessary descriptions for each task or chore that is to be performed by the patient. The underlying code logic of the software constantly watches the calendar events and when the event time matches with the current time, the underlying code logic triggers an action to announce the chore/task details or calendar event details from the audio speaker and also displayed on patient display screen to catch the attention of the patient. In some embodiments, the underlying logic of the software running on the visitor recognition computing device asks the patient to audible announce an acknowledgment of completion or press an acknowledgment button after a set time (e.g., after two minutes) once the task is performed. This will send an SMS text message to the care giver to inform them that patient is on track with the daily chores. For Alzheimer's patients who live alone, or who live in their homes alone most of the day time while their care givers are at work, this system provides them extensive assistance and also monitoring capabilities to the care giver so they are constantly informed and also keeps the patient safe and healthy.

To make the visitor detection, facial recognition, and alert system of the present disclosure, one may connect the motion sensor and camera to the visitor recognition computing device and write a software application (with one or more software modules), which when running on the visitor recognition computing device, detects motion of visitors outside a patient's door of their house or dwelling, and when motion is detected, triggers the camera to capture an image of the visitor, which is ingested, analyzed according to facial recognition techniques, and used to search for matching contact imagery to determine whether the visitor is a known visitor or an unknown visitor, and thereafter visually and audibly inform the patient inside the house or dwelling that there is a visitor outside the door, and the visitor is either unrecognized and recognized, which is followed by either display and voice descriptions of the known visitor details, and/or text message notification sent to the pre-configured contact(s), such as caregiver, spouse, close friend, relative, etc., as to the present existence of a visitor outside the patient's door. And when calendar events are detected, the software is triggered to visually and audible inform the patient of the calendar event (e.g., task, reminder) with specific details or step-by-step instructions to completing or carrying out the requisite steps of the task or event.

By way of example, FIG. 1 conceptually illustrates a perspective view of a visitor detection, facial recognition, and alert system 100 which assists a memory-challenged patient to distinguish between known and unknown visitors and informs a caretaker of such known and unknown visitors. As shown in this figure, the visitor detection, facial recognition, and alert system 100 is deployed at an entryway door 150 of a memory-challenged patient. The visitor detection, facial recognition, and alert system 100 includes a patient display screen 110, a motion sensor 120 mounted nearby the entryway door 150, a visitor recognition computing device 130 that performs processing of imagery captured by a camera 140, which is also mounted nearby the entryway door 150. When a visitor approaches the entryway door 150, the motion sensor 120 detects the motion and sends a signal to the visitor recognition computing device 130. Upon receiving the motion detection signal, the visitor recognition computing device 130 triggers a signal to the camera 140 to take a picture of the visitor. The camera 140 takes the picture and transmits the captured image of the visitor back to the visitor recognition computing device 130 to perform facial recognition. Using training data sets, a facial recognition module running on the visitor recognition computing device 130 searches for matches to the captured image of the visitor. When a match is found, then visitor shown in the captured image is identified (by retrieving additional details associated with the matching training data set picture). Then the visitor recognition computing device 130 sends the recognized image of the matched visitor to the patient display screen 110 to visually alert the memory-challenged patient in the house or dwelling of the visual identity of the visitor at the door. The visitor recognition computing device 130 also outputs textual information that describes the relationship of the visitor to the memory-challenged patient, indicating ultimately that the visitor is a known contact, and providing additional details such as name, relationship, etc. In some embodiments, the visitor recognition computing device 130 also triggers a voice and audio component (not shown in this figure, but communicably connected by wired or wireless connection to the visitor recognition computing device 130) to audibly announce the recognized visitor's identity and details. In this way, the memory-challenged patient gets both audio and visual notifications of the known visitor.

On the other hand, when the visitor recognition computing device 130 cannot identify the visitor by comparing the captured image of the visitor to the train data sets as processed by the facial recognition module, then the visitor recognition computing device 130 visually outputs a warning alert to indicate that the visitor at the door is unknown. The audio warning may also be issued. Additionally, in some embodiments, the visitor recognition computing device 130 transmits a text message and the captured image of the visitor to a mobile device of a pre-configured contact (such as a caregiver, close friend, blood relation, etc.) by way of a cloud-based messaging service. In this way, the memory-challenged patient is able to stay safe and clear of unknown visitors, and others can be contacted and notified of the unknown visitor outside the door of the memory-challenged patient, and can thereafter take remedial action such as calling the memory-challenged patient and instructing him or her not to open the door, or provide some other instruction as they see fit.

Figure 2:
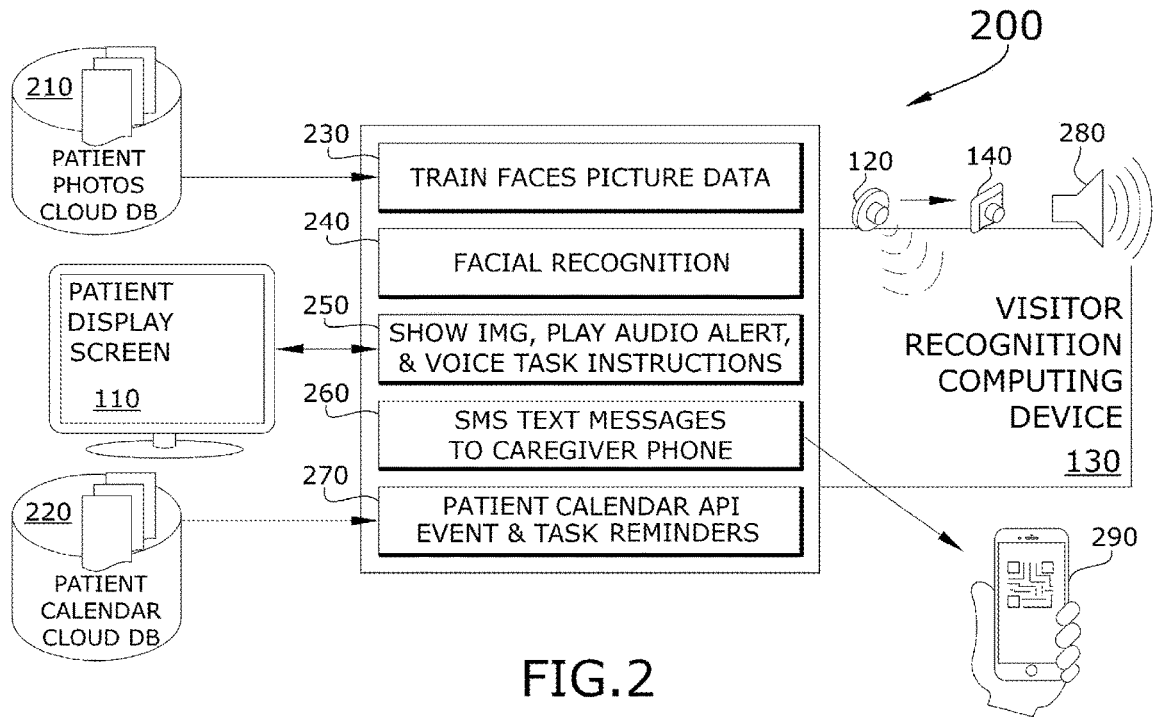
FIG. 2 conceptually illustrates an engineering block diagram of the visitor detection, facial recognition, and alert system and a plurality of visitor detection, facial recognition, and alert process modules for assisting memory-challenged patients to recognize entryway visitors in some embodiments.

Now turning to another example, FIG. 2 conceptually illustrates an engineering block diagram of the visitor detection, facial recognition, and alert system and a plurality of visitor detection, facial recognition, and alert process modules for assisting memory-challenged patients to recognize entryway visitors 200. As shown in this figure, the visitor detection, facial recognition, and alert system and the plurality of visitor detection, facial recognition, and alert process modules for assisting memory-challenged patients to recognize entryway visitors 200 include the patient display screen 110, the motion sensor 120, the visitor recognition computing device 130, the camera 140, a patient photos cloud database 210 such as Google Photos or another cloud photo repository service, a patient calendar cloud database 220 such as Google Calendar or another cloud calendar service, a facial recognition image training module 230, a visitor detection and facial recognition module 240, a detected visitor alert and patient notification module 250, a visitor alert and caregiver notification module 260, a patient calendar event and task reminder module 270, an audio speaker 280, and a caregiver mobile device 290. In some embodiments, the patient calendar event and task reminder module 270 is based on Google Calendar API that is used to code an integration of Google Calendar into software running on the visitor recognition computing device 130 to provide patient reminders of scheduled events and tasks, including step-by-step instructions for completing daily or sporadic tasks by the memory-challenged patient.

In some embodiments, the facial recognition image training module 230 trains the visitor detection, facial recognition, and alert system to recognize known visitors based on one or more photos of each contact or person ("known photos" or "known visitor photos") with at least one facial photo who is known to the memory-challenged patient. In some embodiments, facial recognition image training starts by the known the facial recognition image training module 230 ingesting known photos so as to create known photo data sets based on learned facially-recognizable images of known visitors of the memory-challenged patient. After one or more known photo data sets are completed (or "learned"), the visitor detection and facial recognition module 240 will be triggered anytime an image is captured by the camera 140 after being instructed by the visitor recognition computing device 130 upon detection of a visitor by the motion sensor 120 at the entryway door 150 of the patient. Based on whether the visitor is recognized or unknown, the detected visitor alert and patient notification module 250 visually outputs the captured image of the visitor onto the patient display screen 110 and plays an audio alert, via the audio speaker 280. In some embodiments, the detected visitor alert and patient notification module 250 is configured to provide step-by-step task instructions via the audio speaker 280 when triggered by the patient calendar event and task reminder module 270. Also, we the detected visitor is determined by the visitor detection and facial recognition module 240 to be an unknown visitor, the visitor alert and caregiver notification module 260 of some embodiments sends a text message with the captured image of the visitor to the caregiver mobile device 290, thereby notifying the caregiver of the potential unknown visitor. In some embodiments, the patient calendar event and task reminder module 270 ingests tasks and events scheduled in the memory-challenged patient's calendar. The memory-challenged patient's calendar may be a Google Calendar cloud-based calendar service or another digital calendar service.

Figure 3:
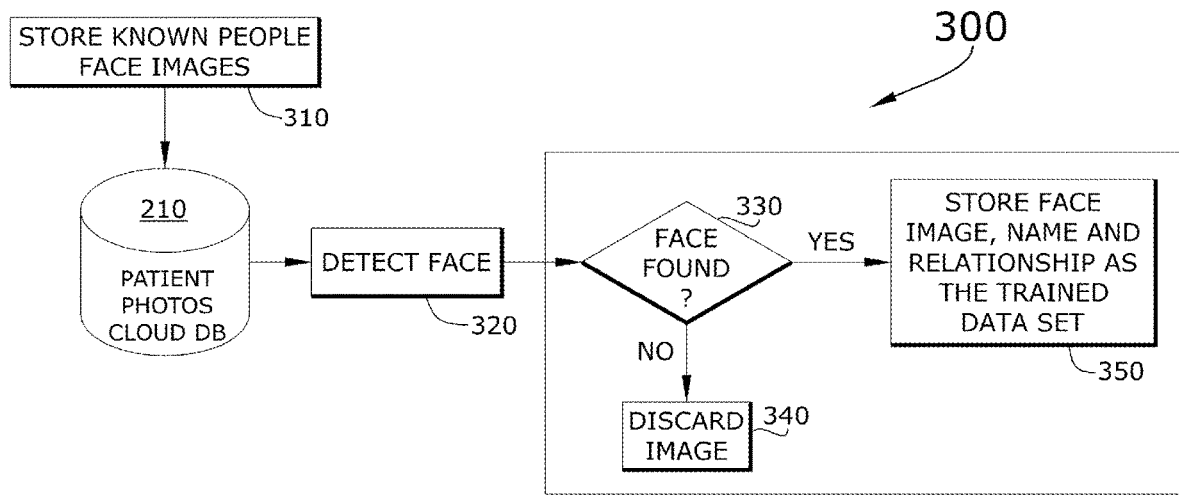
FIG. 3 conceptually illustrates a known person facial recognition image training process in some embodiments.

While the example above provides an example of the modular breakdown of work by the visitor detection, facial recognition, and alert system, the operations involved in carrying out the work by these modules is completed by processes, which are described below by reference to FIGS. 3-5. Specifically, FIG. 3 conceptually illustrates a known person facial recognition image training process 300. In some embodiments, the known person facial recognition image training process 300 is performed by the facial recognition image training module 230 of the visitor detection, facial recognition, and alert system. As shown in this figure, the known person facial recognition image training process 300 includes steps for storing (at 310) face images of people known by a memory-challenged patient. In some embodiments, the known people face images are stored in the patient photos cloud database 210, such as a Google Photos. The next step includes detection of a face (at 320) in a stored face image. In some embodiments, the known person facial recognition image training process 300 determines (at 330) whether the face is found or not. When the face is not found, the known person facial recognition image training process 300 discards the image (at 340) and either ends or returns to process more stored images. On the other hand, when the face is found (at 340), then the known person facial recognition image training process 300 stores the face image, name and relationship as a trained data set (at 350) which is then made available for facial recognition of visitors in realtime as they approach the entryway door 150 of the memory-challenged patient. Then the known person facial recognition image training process 300 either ends or returns to process more stored images.

Figure 4:
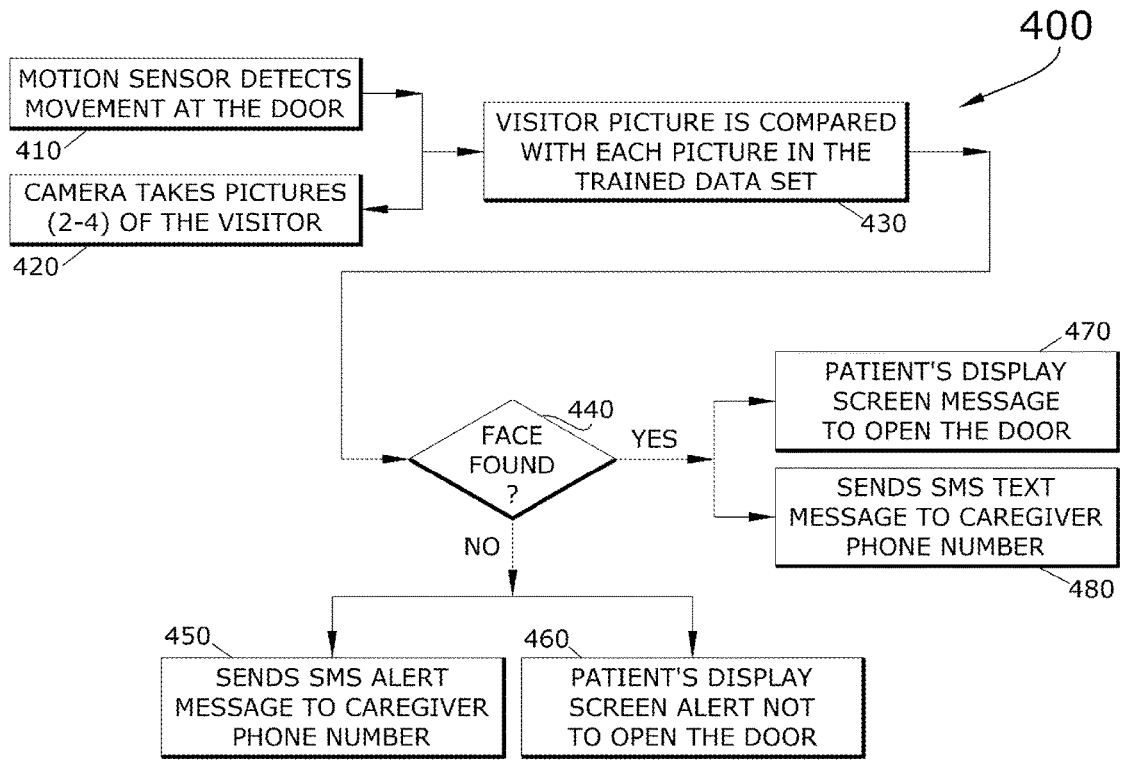
FIG. 4 conceptually illustrates a visitor detection, facial recognition, and alert process for assisting a memory-challenged patient to distinguish between known and unknown visitors and informs a caretaker of such known and unknown visitors in some embodiments.

Next, FIG. 4 conceptually illustrates a visitor detection, facial recognition, and alert process for assisting a memory-challenged patient to distinguish between known and unknown visitors and informs a caretaker of such known and unknown visitors 400. In some embodiments, the visitor detection, facial recognition, and alert process for assisting a memory-challenged patient to distinguish between known and unknown visitors and informs a caretaker of such known and unknown visitors 400 is performed by the visitor detection and facial recognition module 240, the detected visitor alert and patient notification module 250, and the visitor alert and caregiver notification module 260 of the visitor detection, facial recognition, and alert system. As shown in this figure, the visitor detection, facial recognition, and alert process for assisting a memory-challenged patient to distinguish between known and unknown visitors and informs a caretaker of such known and unknown visitors 400 starts when the motion sensor detects movement at the door (at 410) of the memory-challenged patient's dwelling or house. Contemporaneously with detecting movement at the door, the camera captures an image of the person/visitor who is the object of movement. In some embodiments, the visitor detection, facial recognition, and alert process for assisting a memory-challenged patient to distinguish between known and unknown visitors and informs a caretaker of such known and unknown visitors 400 triggers the camera to take multiple pictures (2-4 pictures) of the visitor (at 420).

After detecting movement and taking pictures of the visitor, the visitor detection, facial recognition, and alert process for assisting a memory-challenged patient to distinguish between known and unknown visitors and informs a caretaker of such known and unknown visitors 400 of some embodiments starts to compare the visitor pictures with each picture in one or more trained data sets (at 430). Next, the visitor detection, facial recognition, and alert process for assisting a memory-challenged patient to distinguish between known and unknown visitors and informs a caretaker of such known and unknown visitors 400 determines (at 440) whether the face is found among the trained data sets. When the face in the visitor pictures is not found, the visitor detection, facial recognition, and alert process for assisting a memory-challenged patient to distinguish between known and unknown visitors and informs a caretaker of such known and unknown visitors 400 sends a text message alert (at 450) to the caregiver mobile device 290. In some embodiments, the text message alert to the caregiver mobile device 290 includes a representative picture from among the 2-4 visitor pictures captured (at 420) by the camera. In addition to sending the text message alert and visitor picture (at 450) to the caregiver mobile device, the visitor detection, facial recognition, and alert process for assisting a memory-challenged patient to distinguish between known and unknown visitors and informs a caretaker of such known and unknown visitors 400 triggers the patient display screen 110 to visually output an alert not to open the door (at 460). In some embodiments, the visitor detection, facial recognition, and alert process for assisting a memory-challenged patient to distinguish between known and unknown visitors and informs a caretaker of such known and unknown visitors 400 also triggers the audio speaker to speak instructions not to open the door because the visitor is unknown.

Figure 6:
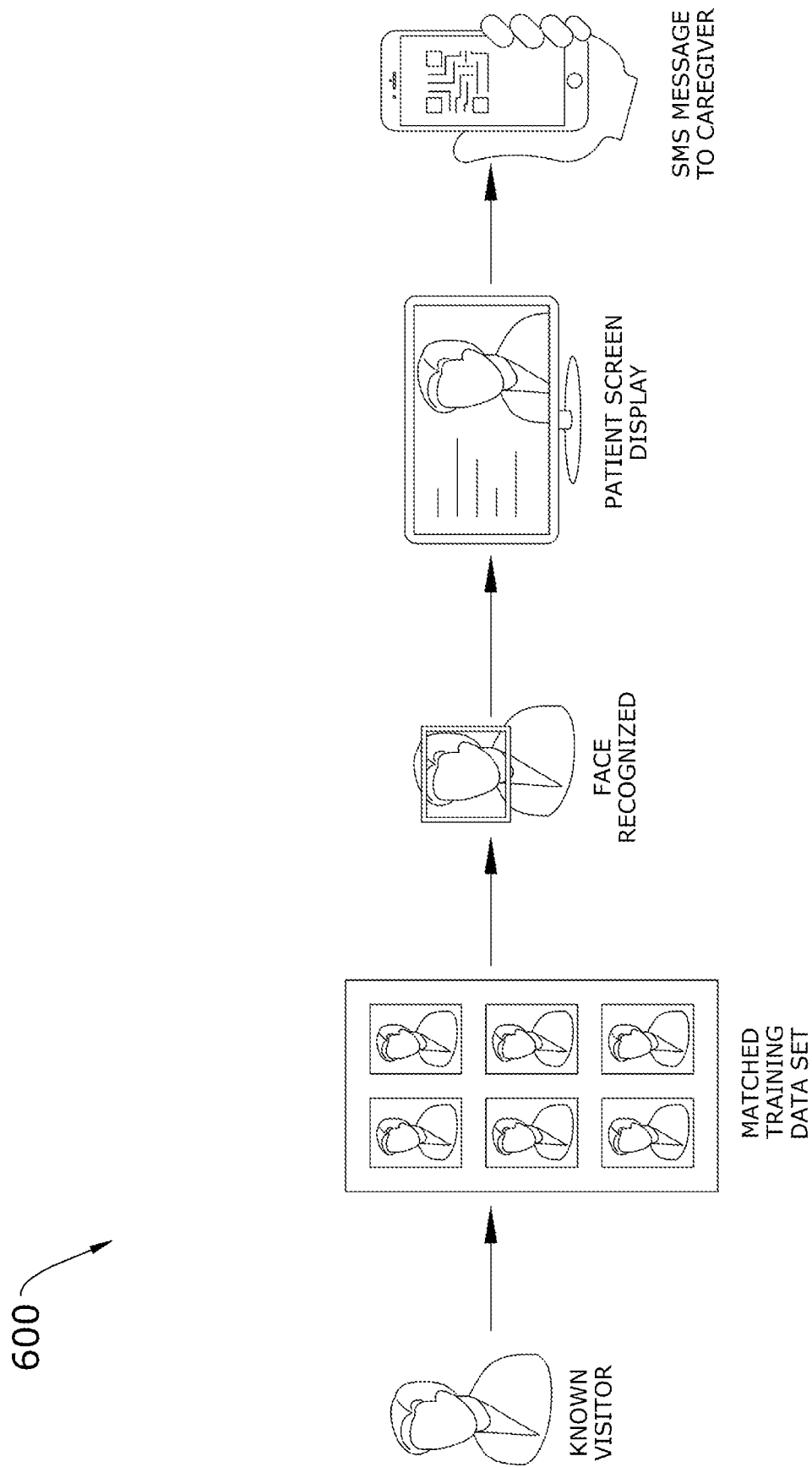
FIG. 6 conceptually illustrates a known user demonstration use case of the visitor detection, facial recognition, and alert system in some embodiments.
Figure 7:
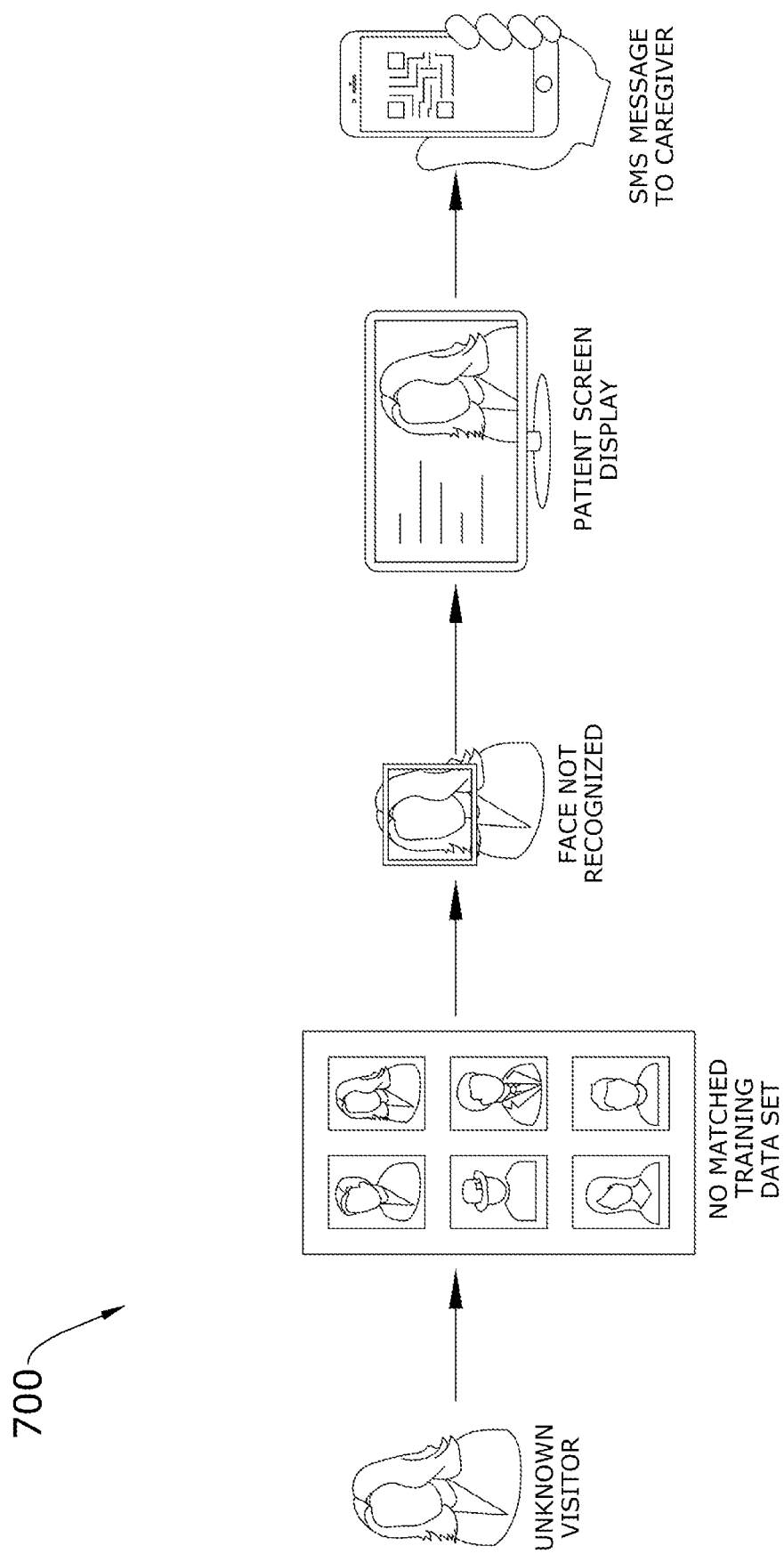
FIG. 7 conceptually illustrates an unknown user demonstration use case of the visitor detection, facial recognition, and alert system in some embodiments.

Referring back to the determination (at 440) of whether the face is found or not, when the face is found, the visitor detection, facial recognition, and alert process for assisting a memory-challenged patient to distinguish between known and unknown visitors and informs a caretaker of such known and unknown visitors 400 of some embodiments triggers the patient display screen 110 to visually output a message indicating the identity and picture of the visitor as a known visitor and that it is OK to open the door (at 470). In some embodiments, the visitor detection, facial recognition, and alert process for assisting a memory-challenged patient to distinguish between known and unknown visitors and informs a caretaker of such known and unknown visitors 400 also triggers the audio speaker to audibly output voice instructions to open the door and including audible information about the identity of the visitor and the relationship to the visitor. In some embodiments, the visitor detection, facial recognition, and alert process for assisting a memory-challenged patient to distinguish between known and unknown visitors and informs a caretaker of such known and unknown visitors 400 then sends a text message (at 480) to the caregiver mobile device 290 to inform the caregiver that the known visitor is at the door of the memory-challenged patient. In this way, the caregiver may wish to call the memory-challenged patient and give instructions and more information as to what should be done under the circumstances of the known visitor being outside the entryway door 150. Then the visitor detection, facial recognition, and alert process for assisting a memory-challenged patient to distinguish between known and unknown visitors and informs a caretaker of such known and unknown visitors 400 is done for this visitor (but continues to run in order to detect movement and captures pictures of visitors who may come to the memory-challenged patient's door at any time). An example known user demonstration use case 600 of the visitor detection, facial recognition, and alert system is conceptually illustrated in FIG. 6. In addition, an example unknown user demonstration use case 700 of the visitor detection, facial recognition, and alert system is conceptually illustrated in FIG. 7. An additional use case example is demonstrated and described below, by reference to FIG. 8, which conceptually illustrates a wandering patient demonstration use case of the visitor detection, facial recognition, and alert system in some embodiments.

Figure 5:
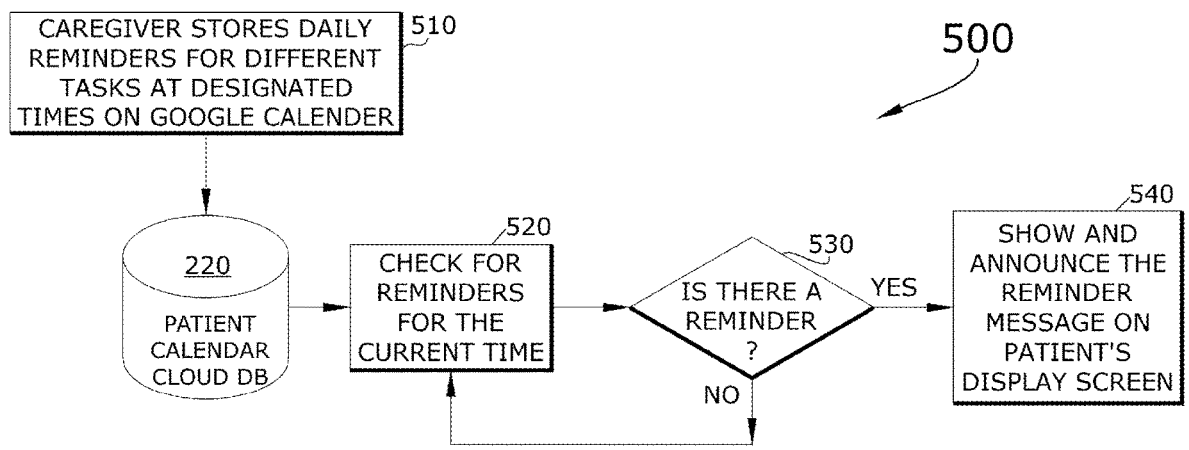
FIG. 5 conceptually illustrates a patient calendar reminder process in some embodiments.

Now turning to another exemplary process, FIG. 5 conceptually illustrates a patient calendar reminder process 500. In some embodiments, the patient calendar reminder process 500 is performed by the patient calendar event and task reminder module 270 of the visitor detection, facial recognition, and alert system. As shown in this figure, the patient calendar reminder process 500 starts with a caregiver inputting and storing daily reminders for different tasks at designated times (at 510) in a cloud-based patient calendar, such as the patient calendar cloud database 220, which may be Google Calendar, or other similar online calendar system. Next, the patient calendar reminder process 500 checks (at a current time and in a continuously repeating loop at a set duration of time) for reminders in the patient calendar (at 520). In some embodiments, the patient calendar reminder process 500 determines (at 530) whether there is a reminder or not. When there is no reminder, the patient calendar reminder process 500 returns to the step for checking (at 520) in repeated cycle. On the other hand, when there is a reminder for the current time, the patient calendar reminder process 500 triggers the patient display screen 110 to visually output the reminder with specific, step-by-step instructions for completing the task or event related to the reminder. In some embodiments, the patient calendar reminder process 500 also triggers the audio speaker 280 to audibly vocalize sound with the reminder and step-by-step instructions for completing the task or event by the memory-challenged patient. Then the patient calendar reminder process 500 ends for this reminder, but continues to process and check for any subsequent reminders of events or tasks which may have been stored by the caregiver.

Figure 8:
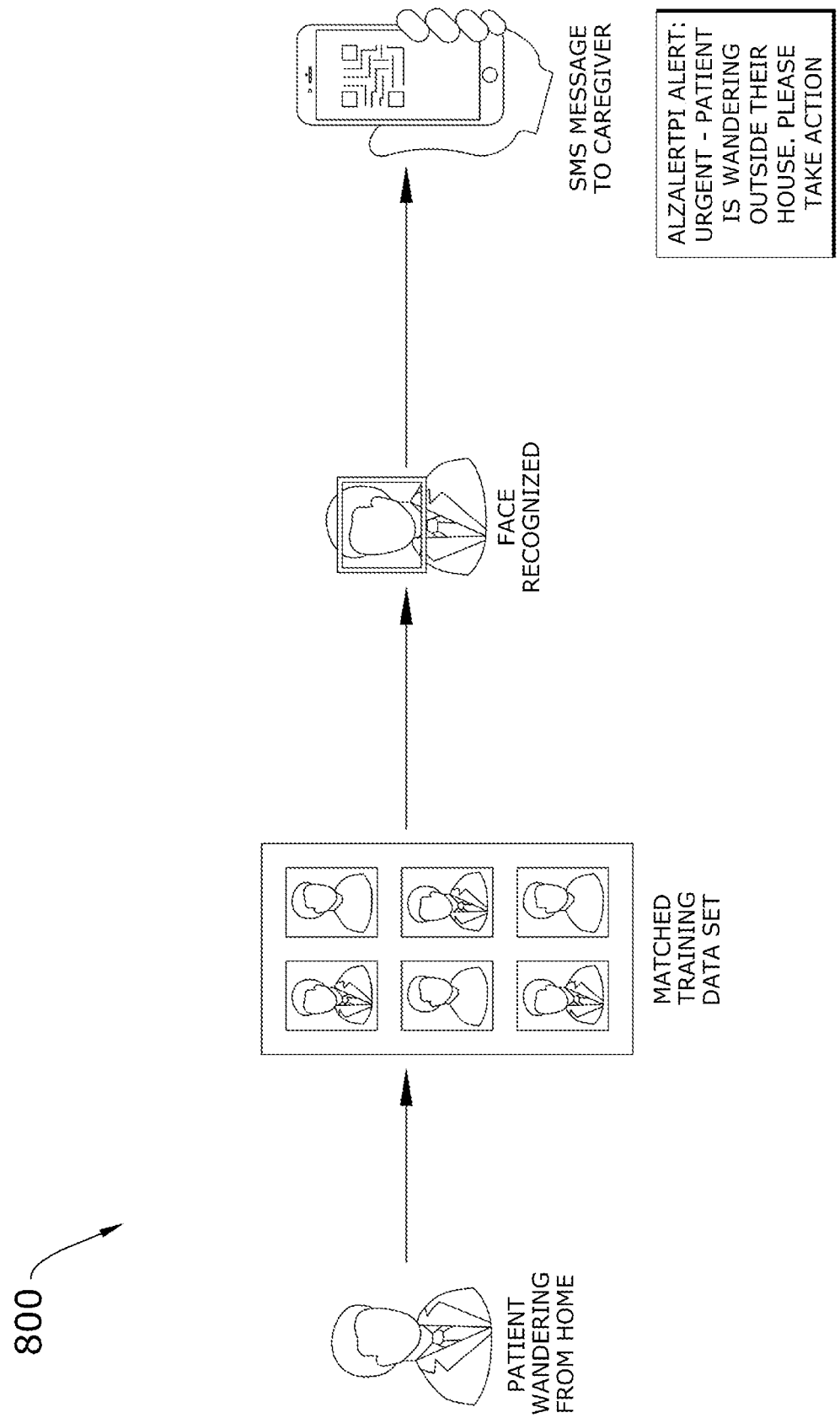
FIG. 8 conceptually illustrates a wandering patient demonstration use case of the visitor detection, facial recognition, and alert system in some embodiments.

Now referring to the third use case example, FIG. 8 conceptually illustrates a wandering patient demonstration use case 800 of the visitor detection, facial recognition, and alert system. As shown, the wandering patient demonstration use case 800 of the visitor detection, facial recognition, and alert system illustrates a scenario in which a memory-challenged patient is detected wandering from his or her home by the motion sensor 120, with the camera 140 capturing an image of the memory-challenged patient as he or she wanders out the door of their house or dwelling. The captured image (which may include 2-4 images) is processed by the facial recognition module against the training data sets. Upon identifying the face in the trained data sets as an affirmative match to the memory-challenged patient, the face is then determined to be recognized, which triggers a text message alert to be sent to the caregiver mobile device 290. For example, the text message alert may include a representative picture of the memory-challenged patient among the 2-4 pictures captured by the camera, along with a text message stating the urgency of the situation in which the memory-challenged patient appears to be wandering off. For instance, the message may alert the caregiver: "Urgent—patient is wandering outside their house. Please take action." The message may be configured according to the expected scenarios in which the urgency would apply. For example, a timed-alert message which allows the memory-challenged patient to "wander" outside their home to water some plants, per reminder task instructions for the day, and only send out the alert text message to the caregiver in the event that the memory-challenged patient does not return back into the home within a specific (pre-defined) time span. In this way, the caregiver is given every opportunity to ensure the safety of the memory-challenged patient while allowing some flexibility to encourage the memory-challenged patient to keep up with chores and tasks in and around the home.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
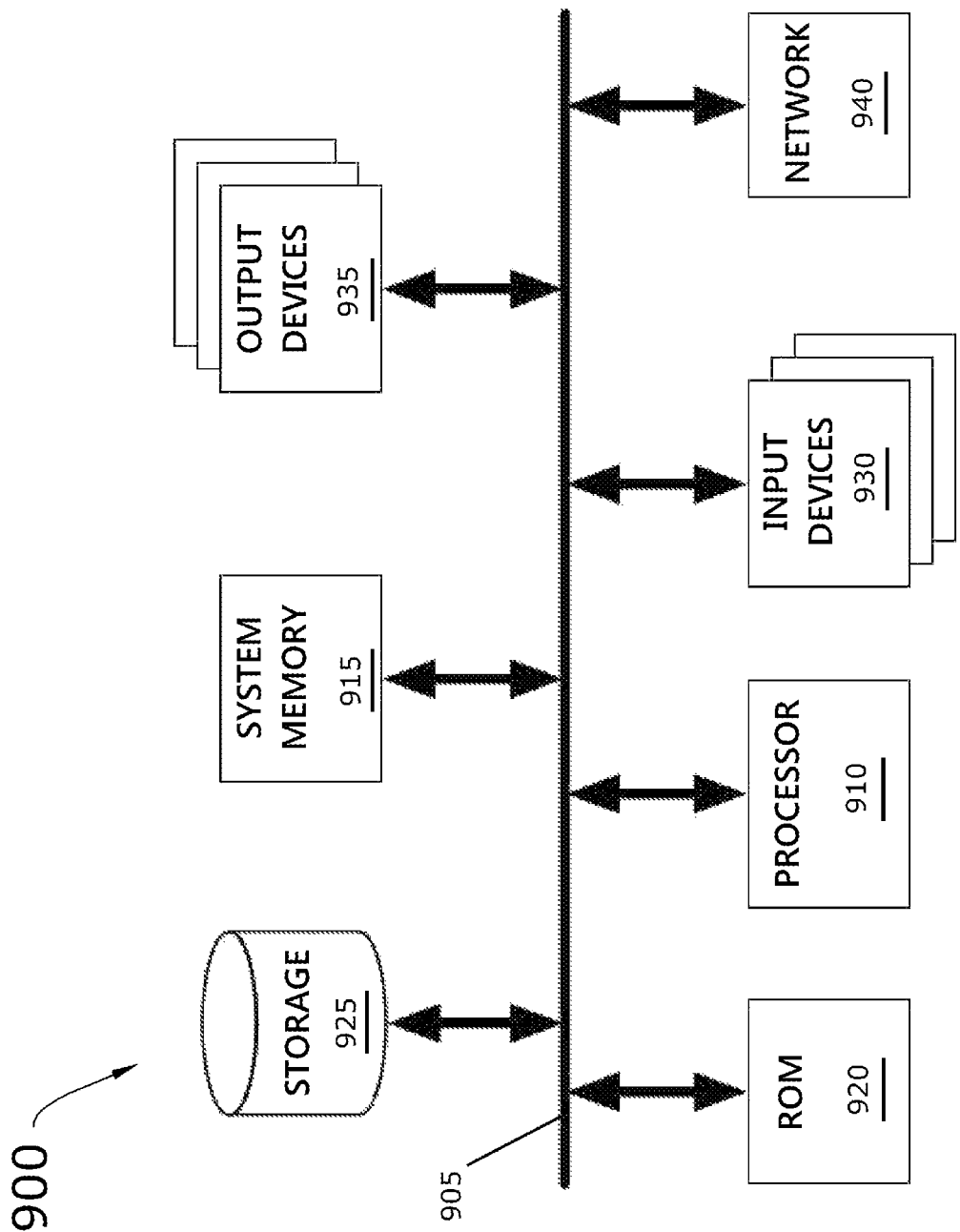
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, mobile device, tablet computing device, phone, personal digital assistant (PDA, such as a iPod), micro-computer (such as, without limitation, a Raspberry Pi single board computer with motion sensor and camera), or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925. From these various memory units, the processing unit(s) 910 retrieves instructions to execute and data to process in order to execute the processes of the invention. The processing unit(s) may be a single processor or a multi-core processor in different embodiments. The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing devices (also called "cursor control devices"). The output devices 935 display images generated by the electronic system 900. The output devices 935 include printers and display devices, such as cathode ray tubes (CRT), liquid crystal displays (LCD), organic light-emitting diode (OLED) displays. Some embodiments include devices such as a touchscreen that functions as both input and output devices. Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an intranet), or a network of networks (such as the Internet). Any or all components of electronic system 900 may be used in conjunction with the invention. The functions or modules described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate runtime or machine-learning training processes or methods, each with multiple steps. In each case, the specific operations of a process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An entryway visitor detection, facial recognition, and alert system that assists a memory-challenged patient to distinguish between known and unknown visitors and informs a caretaker of the known and unknown visitors, said entryway visitor detection, facial recognition, and alert system comprising:
   a patient display screen that is configured to visually output information about visitors at an entryway door of a home of the memory-challenged patient;
   a motion sensor that is configured to detect movement outside of the entryway door;
   a camera that is configured to capture one or more images of a visitor when the motion sensor detects movement outside of the entryway door;
   a visitor recognition computing device that is configured to carry out runtime software instructions to perform facial recognition of the one or more images of the visitor to determine whether the visitor is recognized, wherein the visitor recognition computing device is further configured to trigger the patient display screen to visually output information about the visitor when the visitor is recognized and to visually output instructions not to open the entryway door when the visitor is not recognized; and
   a visitor detection, facial recognition, and alert software application that is stored on a permanent storage device of the visitor recognition computing device, wherein the visitor detection, facial recognition, and alert software application comprises a facial recognition image training module, a visitor detection and facial recognition module, a detected visitor alert and patient notification module, a visitor alert and caregiver notification module, and a patient calendar event and task reminder module, wherein the visitor detection, facial recognition, and alert software application is configured to perform facial recognition against the one or more images of the visitor to determine whether the visitor is recognized when the visitor detection, facial recognition, and alert software application is running on a processing unit of the visitor recognition computing device.

2. The entryway visitor detection, facial recognition, and alert system of claim 1, wherein the visitor recognition computing device is configured to send an alert text message to a caregiver mobile device when the visitor is not recognized.

3. The entryway visitor detection, facial recognition, and alert system of claim 1 further comprising an audio speaker.

4. The entryway visitor detection, facial recognition, and alert system of claim 3, wherein the visitor recognition computing device is configured to audibly vocalize an announcement to aurally alert the memory-challenged patient upon determining whether the visitor is recognized.

5. The entryway visitor detection, facial recognition, and alert system of claim 1, wherein the announcement comprises an alert with spoke instructions not to open the entryway door when the visitor is not recognized.

6. The entryway visitor detection, facial recognition, and alert system of claim 5, wherein the announcement comprises audibly spoken information describing identity and relationship of the visitor to the memory-challenged patient when the visitor is recognized.

7. The entryway visitor detection, facial recognition, and alert system of claim 1, wherein the facial recognition image training module is configured to perform facial recognition training based on photos of persons known by the memory-challenged patient to generate a training data set used in recognizing visitors detected at the entryway door, wherein the visitor detection and facial recognition module is configured to use the training data set to perform facial recognition in comparison to each picture captured by the camera when the motion sensor detects movement nearby the entryway door, wherein the detected visitor alert and patient notification module is configured to trigger the patient display screen to visually output a pre-configured safe color-coded border around the information about the visitor when the visitor is recognized and to visually output a pre-configured warning color-coded border around the instructions not to open the door when the visitor is not recognized, wherein the patient calendar event and task reminder module is configured to perform calendar checks to determine whether the memory-challenged patient has a current calendar event and, when the memory-challenged patient affirmatively has a particular current calendar event, visually output step-by-step instructions for completing one of a task and a chore associated with the particular current calendar event.

8. The entryway visitor detection, facial recognition, and alert system of claim 7, wherein the photos of persons known by the memory-challenged patient are input to the facial recognition image training module from a patient photos cloud database, wherein the patient calendar event and task reminder module is configured to perform calendar checks in connection with a patient calendar online database, wherein the particular current calendar event is previously input by the caretaker.

* * * * *